US008832602B2

(12) United States Patent
Lee

(10) Patent No.: US 8,832,602 B2
(45) Date of Patent: Sep. 9, 2014

(54) MENU DISPLAY APPARATUS AND METHOD AND RECORDING MEDIUM STORING COMPUTER PROGRAM FOR EXECUTING THE MENU DISPLAY METHOD

(71) Applicant: Samsung Electronics Co., Ltd., Gyeonggi-do (KR)

(72) Inventor: Jung-won Lee, Bundang-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/739,900

(22) Filed: Jan. 11, 2013

(65) Prior Publication Data

US 2013/0132902 A1 May 23, 2013

Related U.S. Application Data

(63) Continuation of application No. 11/327,369, filed on Jan. 9, 2006, now abandoned.

(30) Foreign Application Priority Data

Mar. 18, 2005 (KR) .................. 10-2005-0022535

(51) Int. Cl.
*G06F 3/048* (2013.01)
*G06F 3/0482* (2013.01)

(52) U.S. Cl.
CPC .... *G06F 3/0482* (2013.01); *G06F 2203/04806* (2013.01)
USPC ....................................................... 715/855

(58) Field of Classification Search
CPC .................................................. G06F 3/0481

USPC ........................................................ 715/855
See application file for complete search history.

(56) References Cited

U.S. PATENT DOCUMENTS 6,343,290 B1   1/2002  Cossins et al.
6,426,761 B1*  7/2002  Kanevsky et al. ............ 715/788
(Continued)

FOREIGN PATENT DOCUMENTS

CN   1201184 A   12/1998
CN   1489751 A    4/2004
(Continued)

OTHER PUBLICATIONS

Communication dated Nov. 18, 2011 issued by the European Patent Office in counterpart European Patent Application No. 06251278.5.

*Primary Examiner* — Enrique Iturralde
(74) *Attorney, Agent, or Firm* — Sughrue Mion, PLLC

(57) ABSTRACT

A menu display apparatus and method, which enable a user to easily and quickly search for content of interest among a plurality of contents shared by a plurality of devices in a home network, are provided. The menu display method includes: receiving information regarding a zoom-in location or a zoom-out location on a current menu screen; and zooming in the current menu screen at the zoom-in location so that a plurality of menus currently displayed on the current menu screen are displayed in more detail, or zooming out the current menu screen at the zoom-out location so that the menus are displayed in less detail. Accordingly, it is possible to minimize content search delay and the user's inconvenience related to a content search, such as too much screen scrolling, and to help the user to easily and quickly search for the content of interest.

20 Claims, 6 Drawing Sheets

(56) References Cited

U.S. PATENT DOCUMENTS

| | | |
|---|---|---|
| 6,801,507 B1 | 10/2004 | Humpleman et al. |
| 6,978,472 B1 | 12/2005 | Nashida et al. |
| 7,200,683 B1 | 4/2007 | Wang et al. |
| 7,292,243 B1 | 11/2007 | Burke |
| 7,600,192 B1 | 10/2009 | Hashimoto et al. |
| 2004/0268393 A1 | 12/2004 | Hunleth et al. |
| 2005/0005241 A1 | 1/2005 | Hunleth et al. |
| 2006/0176403 A1 | 8/2006 | Gritton et al. |
| 2007/0192739 A1 | 8/2007 | Hunleth et al. |
| 2008/0276280 A1 * | 11/2008 | Nashida et al. ............ 725/48 |

FOREIGN PATENT DOCUMENTS

| | | |
|---|---|---|
| EP | 1052849 A1 | 11/2000 |
| JP | 4-184570 A | 7/1992 |
| JP | 5-143588 A | 6/1993 |
| JP | 7-6014 A | 1/1995 |
| JP | 8-263255 A | 10/1996 |
| WO | 0161444 A2 | 8/2001 |
| WO | 2005055569 A2 | 6/2005 |

* cited by examiner

MENU DISPLAY APPARATUS AND METHOD AND RECORDING MEDIUM STORING COMPUTER PROGRAM FOR EXECUTING THE MENU DISPLAY METHOD

CROSS-REFERENCE TO RELATED PATENT APPLICATION

This application is a Continuation of U.S. application Ser. No. 11/327,369, filed Jan. 9, 2006, which claims priority from Korean Patent Application No. 10-2005-0022535, filed on Mar. 18, 2005, in the Korean Intellectual Property Office, the disclosures of which are incorporated herein in their entirety by reference.

BACKGROUND OF THE INVENTION

1. Technical Field

Apparatuses and methods consistent with the present invention relate to menu display for easily and quickly searching for contents shared by a plurality of devices in a home network.

2. Related Art

Related art developments in network communications technology allow a plurality of devices to share a considerable amount of content with one another via a network. Thus, related art research has focused on easily and quickly finding content of interest among a large amount of content.

FIG. 1 is a diagram illustrating a related art menu display method. When a user manipulates a mouse or a keyboard, a current menu screen is switched from a first menu screen 11, which displays a plurality of menus related to a list of a plurality of devices, to a second menu screen 12, which displays a plurality of menus related to a plurality of content types into which contents of the devices are classified. Thereafter, when the user further manipulates the mouse or the keyboard, the current menu screen is switched from the second menu screen 12 to a third menu screen 13, which displays a list of contents belonging to one of the menus displayed on the second menu screen 12, and respective detailed information.

However, if a considerable number of devices need to be represented by the related art menu display method, and each of the devices contains a considerable number of contents, menus related to a list of the devices or a list of the contents may not be able to be displayed on the same menu screen. To search for a device of interest or a content of interest, a user may have to scroll up or down a considerable number of times. For example, if thousands of devices are represented by the related art menu display method and a maximum number of menus that can be displayed on one menu screen provided by the related art menu display method is 10, a user may have to scroll up or down several hundreds of times to search for a device or a content of interest.

Thus, the related art menu display method is time-consuming when a contents list includes a considerable number of contents entries. In addition, the user must memorize the location of each of the contents in the contents list to quickly search the contents list for the content of interest. Thus, without knowing the exact location of the content of interest in the contents list, the user may not be able to quickly search for the content of interest, even though the user has rapidly accessed the contents list.

SUMMARY OF THE INVENTION

The present invention provides a menu display apparatus and method which enable a user to easily and quickly search for content of interest. The present invention also provides a computer-readable recording medium storing a computer program for executing the menu display method.

According to an aspect of the present invention, there is provided a menu display method which includes: receiving information regarding a zoom-in location or a zoom-out location on a current menu screen; and zooming in the current menu screen at the zoom-in location so that a plurality of menus currently displayed on the current menu screen are displayed in more detail or zooming out the current menu screen at the zoom-out location so that the menus are displayed in less detail.

According to another aspect of the present invention, there is provided a menu display apparatus which includes: an input unit which receives information regarding a zoom-in location or a zoom-out location on a current menu screen; and a display unit which zooms in the current menu screen at the zoom-in location so that a plurality of menus currently displayed on the current menu screen are displayed in more detail or zooms out the current menu screen at the zoom-out location so that the menus currently displayed on the current menu screen are displayed in less detail.

According to anther aspect of the present invention, there is provided a computer-readable recording medium storing a computer program for executing a menu display method. The menu display method includes: receiving information regarding a zoom-in location or a zoom-out location on a current menu screen; and zooming in the current menu screen at the zoom-in location so that a plurality of menus currently displayed on the current menu screen are displayed in more detail or zooming out the current menu screen at the zoom-out location so that the menus currently displayed on the current menu screen are displayed in less detail.

According to another aspect of the present invention, there is provided a menu display method which includes: receiving information regarding a zoom-in location on a current menu screen; and zooming the current menu screen in to the zoom-in location so that a plurality of menus currently displayed on the current menu screen are displayed in more detail.

According to another aspect of the present invention, there is provided a menu display apparatus which includes: an input unit which receives information regarding a zoom-in location on a current menu screen; and a display unit which zooms in the current menu screen at the zoom-in location so that a plurality of menus currently displayed on the current menu screen are displayed in more detail.

According to another aspect of the present invention, there is provided a computer-readable recording medium storing a computer program for executing a menu display method. The menu display method includes: receiving information regarding a zoom-in location on a current menu screen; and zooming in the current menu screen at the zoom-in location so that a plurality of menus currently displayed on the current menu screen are displayed in more detail.

According to another aspect of the present invention, there is provided a menu display method which includes: receiving information regarding a zoom-out location on a current menu screen; and zooming out the current menu screen at the zoom-out location so that a plurality of menus currently displayed on the current menu screen are displayed in less detail.

According to another aspect of the present invention, there is provided a menu display apparatus which includes: an input unit which receives information regarding a zoom-out location on a current menu screen; and a display unit which zooms out the current menu screen at the zoom-out location so that a plurality of menus currently displayed on the current menu screen are displayed in less detail.

According to another aspect of the present invention, there is provided a computer-readable recording medium storing a computer program for executing a menu display method. The menu display method includes: receiving information regarding a zoom-out location on a current menu screen; and zooming out the current menu screen at the zoom-out location so that a plurality of menus currently displayed on the current menu screen are displayed in less detail.

BRIEF DESCRIPTION OF THE DRAWINGS

The above and other features of the present invention will be more apparent from the detailed description of the exemplary embodiments thereof in conjunction with the attached drawings, in which.

DETAILED DESCRIPTION OF EXEMPLARY EMBODIMENTS OF THE INVENTION

The exemplary embodiments of the present invention will now be described more fully with reference to the accompanying drawings in which exemplary embodiments of the invention are shown.

Figure 1:
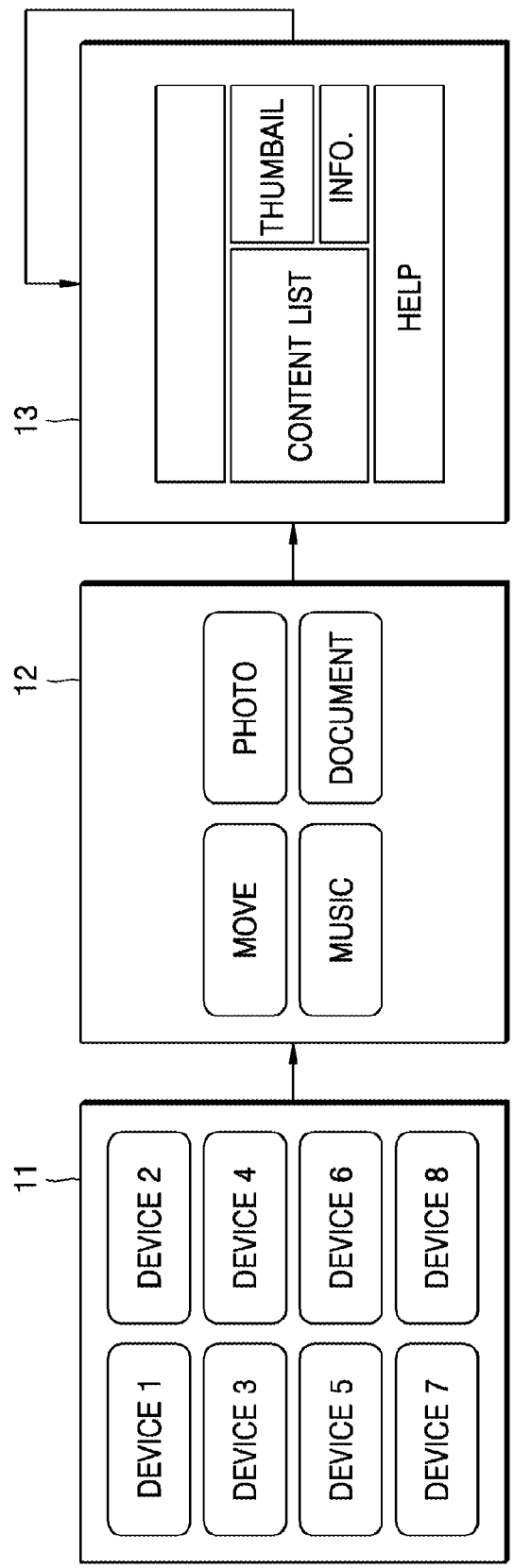
FIG. 1 is a diagram illustrating a related art menu display method.
Figure 2:
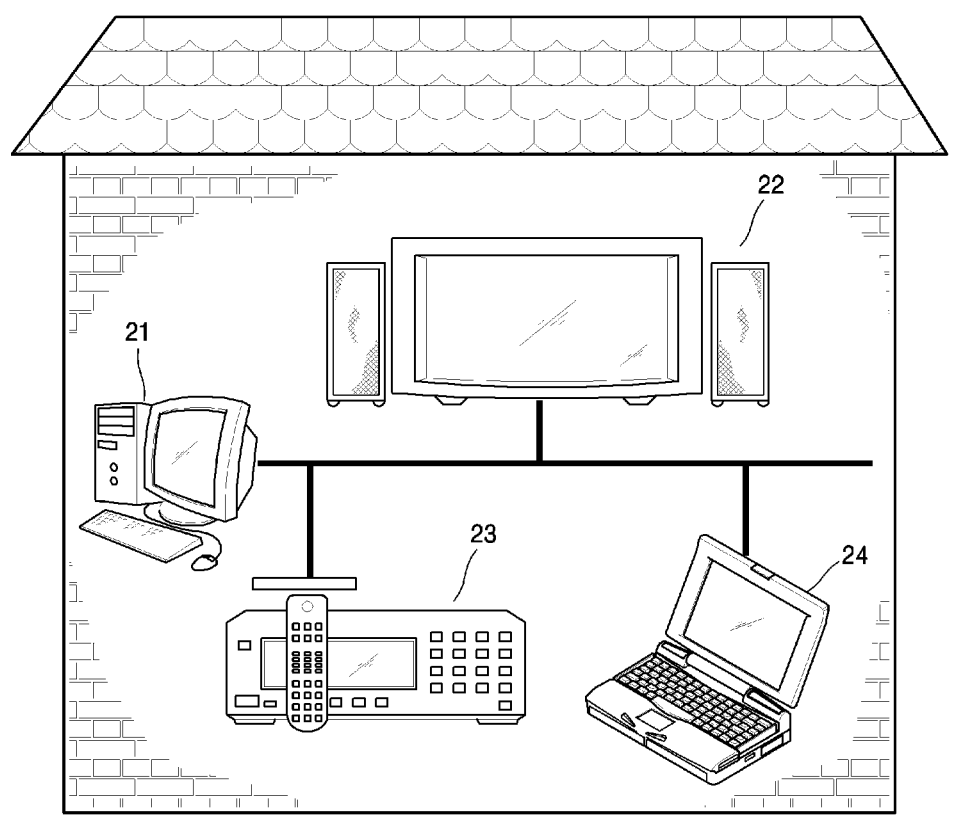
FIG. 2 is a diagram illustrating a home network environment to which exemplary embodiments of the present invention can be applied.

FIG. 2 is a diagram illustrating a home network environment to which exemplary embodiments can be applied. The home network environment may consist of a desktop computer 21, a digital television (TV) 22, a digital versatile disc player 23, and a laptop computer 24, which are connected to a network. However, this embodiment is not limited thereto, and may include other network-connectable devices, as would be understood by one of ordinary skill in the art.

Figure 3:
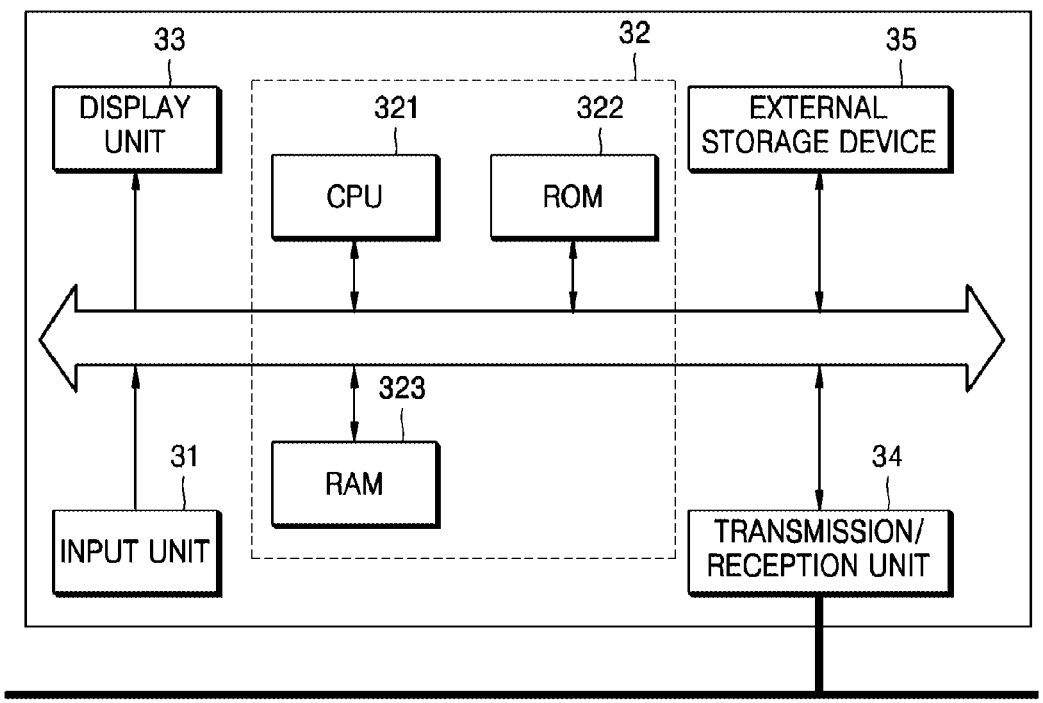
FIG. 3 is a block diagram of a menu display apparatus according to an exemplary embodiment of the present invention.

FIG. 3 is a block diagram of a menu display apparatus according to an exemplary embodiment. The menu display apparatus includes an input unit 31, a menu zoom-in or zoom-out unit 32, a display unit 33, a transmission/reception unit 34, and an external storage device 35. For example, but not by way of limitation, the menu display apparatus may be installed in the desktop computer 21 of FIG. 2 or in any of the other devices included in the home network environment of FIG. 2, and/or other devices not included in FIG. 2 as would be understood by one of ordinary skill in the art.

The input unit 31 receives information regarding a zoom-in location or a zoom-out location on a current menu screen from a user. For example but not by way of limitation, the user selects a location on the current menu screen to be zoomed in or zoomed out using a user interface such as (but not limited to) a mouse or keyboard. Then, the input unit 31 receives information regarding the location of the selected portion on the current menu screen as the information regarding the zoom-in location or the zoom-out location.

In addition, the input unit 31 may successively receive the information regarding the zoom-in location or the zoom-out location from the user an arbitrary number of times. The number of times that the information regarding the zoom-in location or the zoom-out location is input to the input unit 31 corresponds to the magnitude of zooming in or out the current menu screen. Moreover, the input unit 31 may receive the information regarding the zoom-in location or the zoom-out location and information regarding the magnitude of zooming in or out with respect to the current menu screen at the substantially same time from the user.

The menu zoom-in or zoom-out unit 32 estimates the area of a portion corresponding to the zoom-in location or the zoom-out location when zooming in or zooming out in units of magnitude. If the information regarding the zoom-in location or the zoom-out location is successively input to the input unit 31 an arbitrary number of times, the menu zoom-in or zoom-out unit 32 calculates the area of the portion when zooming in or zooming out in the units of magnitude multiplied by the arbitrary number.

The menu zoom-in or zoom-out unit 32 reads menu data necessary for displaying the calculated area of the portion when zooming in or zooming out from the external storage device 35, and displays the read menu data to the display unit 33. The external storage device 35 stores a plurality of menu data provided by the devices included in the home network environment of FIG. 2, for example but not by way of limitation, the digital TV 22, the DVD player 23, and the laptop computer 24. The menu zoom-in or zoom-out unit 32 may issue a request for the transmission of the menu data to the devices 22 through 24 via the transmission/reception unit 34 and read the menu data from the external storage device 35 via the transmission/reception unit 34, instead of from the devices 22 through 24, in a response to the request.

If the current menu screen is zoomed in to the extent that lower menus below the menus displayed on the current menu screen can be displayed, the menu zoom-in or zoom-out unit 32 also reads menu data necessary for switching the current menu screen to a menu screen for displaying the lower menus, i.e., menu data regarding the lower menus, from the external storage device 35.

For example but not by way of limitation, it is assumed that menus related to the devices 22 through 24 included in the home network environment of FIG. 2 and menus related to a plurality of contents of the devices 22 through 24 are provided. If the current menu screen displays the menus related to the devices 22 through 24 and is zoomed in to the extent that the menus related to the contents of the devices 22 through 24 can be displayed, the menu zoom-in or zoom-out unit 32 reads menu data necessary for switching the current menu screen to a menu screen for displaying the menus related to the contents of the devices 22 through 24 from the external storage device 35.

If the current menu screen is zoomed out to the extent that upper menus above the menus currently displayed on the current menu screen can be displayed, the menu zoom-in or zoom-out unit 32 reads menu data necessary for switching the current menu screen to a menu screen for displaying the upper menus, i.e., menu data regarding the upper menus, from the external storage device 35.

For example but not by way of limitation, if the current menu screen displays the menus related to the contents of the devices 22 through 24 and is zoomed out to the extent that the menus related to the devices 22 through 24 can be displayed, the menu zoom-in or zoom-out unit 32 reads menu data necessary for switching the current menu screen to a menu screen for displaying the menus related to the devices 22 through 24 from the external storage device 35.

The menu zoom-in or zoom-out unit 32 includes a central processing unit (CPU) 321, a read only memory (ROM) 322, and a random access memory (RAM) 323. The CPU 321 carries out all of the calculations and data readings described above and then outputs the results. The ROM 322 stores a BIOS program, and the RAM 323 is the main memory of the CPU 321. In other words, when the user turns on the desktop computer 21, the CPU 321 loads a menu zoom-in or zoom-out program stored in the external storage device 35 in the RAM 323, carries out all of the calculations and readings described above using the menu zoom-in or zoom-out program, and outputs the results.

The display unit 33 displays the current menus in more detail or in less detail by zooming in the current menu screen at the zoom-in location input to the input unit 31, or zooming out the current menu screen at the zoom-out location input to the input unit 31 based on the menu data read out by the menu zoom-in or zoom-out unit 32. If the information regarding the zoom-in location or the zoom-out location is successively input to the input unit 31 an arbitrary number of times, the degree to which the current menus are displayed in detail increases or decreases proportionately to the arbitrary number.

More specifically, if the current menu screen is determined to be zoomed in to the extent that the lower menus can be displayed, the display unit 33 switches the current menu screen to the menu screen for displaying the lower menus. For example but not by way of limitation, if the current menus are the menus related to the devices 22 through 24 and the current menu screen is determined to be zoomed in to the extent that the lower menus can be displayed, the display unit 33 switches the current menu screen to the menu screen for displaying the lower menus, i.e., the menus related to the contents possessed by the devices 22 through 24.

If the current menu screen is determined to be zoomed out to the extent that the upper menus can be displayed, the display unit 33 switches the current menu screen to the menu screen for displaying the upper menus. For example but not by way of limitation, if the current menus are the menus related to the contents possessed by the devices 22 through 24 and the current menu screen is determined to be zoomed out to the extent that the upper menus can be displayed, the display unit 33 switches the current menu to the menu screen for displaying the upper menus, i.e., the menus related to the devices 22 through 24.

The display unit 33 may display the menus related to the devices 22 through 24 as a map to indicate the locations of the devices 22 through 24 in the home network environment of FIG. 2 or the storage capacities of the devices 22 through 24. Accordingly, a user can easily and quickly search for content of interest with reference to only a few pieces of information regarding the locations and storage capacities of the devices 22 through 24 in the home network environment and easily memorize what contents belong to the devices 22 through 24 with reference to the menus displayed by the display unit 33.

The display unit 33 may display the current menus, for example but not by way of limitation, the menus related to the devices 22 through 24, or the menus related to the contents possessed by the devices 22 through 24, in different colors. Accordingly, a user can more easily and more quickly find the content of interest and more easily memorize the contents of the devices 22 through 24 with reference to the menus displayed by the display unit 33.

The transmission/reception unit 34 transmits a request issued by the menu zoom-in or zoom-out unit 32 to the devices 22 through 24 in the home network environment of FIG. 2 via a network and outputs menu data transmitted by the devices 22 through 24 to the external storage device 35. The transmission/reception unit 34 may be a network interface card, but is not limited thereto.

The external storage device 35 stores an operating system (OS), the menu zoom-in or zoom-out program, and the menu data output by the transmission/reception unit 34. The external storage device 35 may be a hard disc, but is not limited thereto, and may be any computer readable data storage device, as would be understood by one of ordinary skill in the art.

Figure 4:
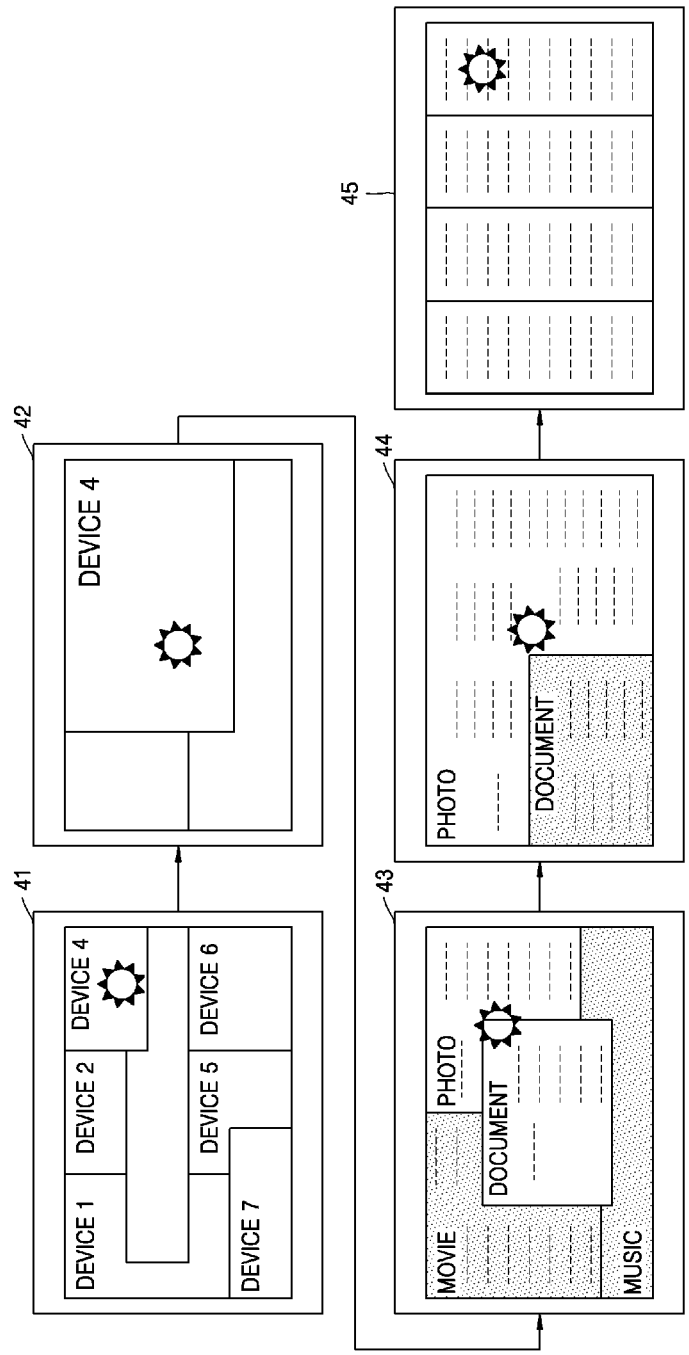
FIG. 4 is a diagram illustrating an exemplary menu search using the menu display apparatus of FIG. 3.

FIG. 4 is a diagram illustrating an example of a menu search using the menu display apparatus of FIG. 3. A user selects a zoom-in icon and places the zoom-in icon at a desired zoom-in location on a first menu screen 41, which is provided by the menu display apparatus of FIG. 3, to display a list of the devices 22 through 24 in the home network environment of FIG. 2 as a map. Thereafter, the user clicks an 'Enter' key on a keyboard a number of times until a portion of the first menu screen 41 corresponding to the zoom-in location is zoomed in by as much as the user wants. Here, the user may click a mouse button instead of the 'Enter' key, or effect the selection in any manner as would be understood by one of ordinary skill in the art. Similarly, in the foregoing disclosure of this exemplary embodiment, the selection of options may be effected in any manner as would be understood by one skilled in the art, and is not limited to the specific instances that are provided herein for illustrative purposes.

When the user clicks the 'Enter' key the number of times with the zoom-in icon placed at the zoom-in location on the first menu screen 41, a current menu screen is switched from the first menu screen 41 to a second menu screen 42. The second menu screen 42 is a zoomed-in view of the first menu screen 41 to the portion and thus is in further detail than the first menu screen 41. However, the current menu screen is not zoomed in yet by as much as the user wants. Thus, the user clicks the 'Enter' key again. Then, the current menu screen is switched from the second menu screen 42 to a third menu screen 43. The third menu screen 43 displays a plurality of lower menus, i.e., a plurality of lower menus related to a plurality of contents of the devices 22 through 24. Thereafter, the user clicks the 'Enter' key again. Then, the current menu screen is switched from the third menu screen 43 to a fourth menu screen 44.

However, although the fourth menu screen 44 provides a zoomed-in view of the third menu screen 43 and is displayed in more detail than the third menu screen 43, the current menu screen is still not zoomed in yet by as much as the user wants. Thus, the user clicks the 'Enter' key again. Then, the current menu screen is switched from the fourth menu screen 44 to a fifth menu screen 45. The fifth menu screen 45 provides a zoomed-in view of a portion of the fourth menu screen 44 and thus is displayed in more detail than the fourth menu screen 44. The fifth menu screen 45 may display part of the list of contents of the devices 22 through 24.

Figure 5:
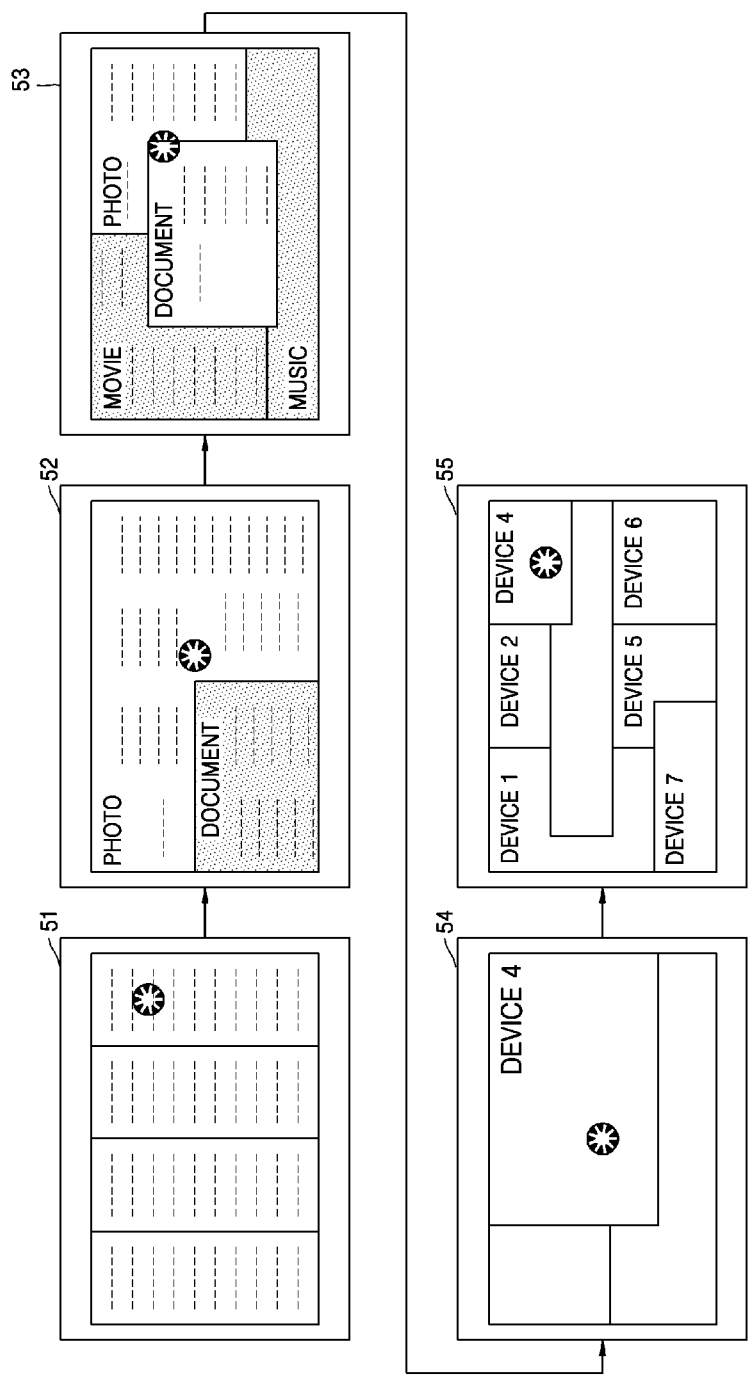
FIG. 5 is a diagram illustrating another exemplary menu search using the menu display apparatus of FIG. 3.

FIG. 5 is a diagram illustrating another exemplary menu search using the menu display apparatus of FIG. 3. A user selects a zoom-out icon and places the zoom-out icon at a desired zoom-out location on a first menu screen 51, which is provided by the menu display apparatus of FIG. 3 to display only part of a list of contents of the devices 22 through 24 in the home network environment of FIG. 2 in detail. Thereafter, the user clicks an 'Enter' key on a keyboard a number of times until the current menu screen is zoomed out by as much as the user desires. Here, the user may click a mouse button instead of the 'Enter' key, or user another manner to effect the selection, as explained above.

When the user clicks the 'Enter' key the number of times with the zoom-out icon placed at the zoom-out location on the first menu screen 51, a current menu screen is switched from the first menu screen 51 to a second menu screen 52. The second menu screen 52 provides a zoomed-out view of the first menu screen 51 and thus is displayed in less detail than the first menu screen 51. However, the current menu screen is not zoomed out yet by as much as the user wants. Thus, the user clicks the 'Enter' key again. Then, the current menu screen is switched from the second menu screen 52 to a third menu screen 53. The third menu screen 53 displays a plurality of menus related to contents of the devices 22 through 24. Thereafter, the user clicks the 'Enter' key again. Then, the current menu screen is switched from the third menu screen 53 to a fourth menu screen 54.

Although the fourth menu screen 54 provides a zoomed-out view of the third menu screen 53 and thus is displayed in less detail than the third menu screen 53, the current menu screen is still not zoomed out yet by as much as the user wants. Thus, the user clicks the 'Enter' key again. Then, the current menu screen is switched from the fourth menu screen 54 to a fifth menu screen 55. The fifth menu screen 55 displays a list of the devices 22 through 24.

Figure 6:
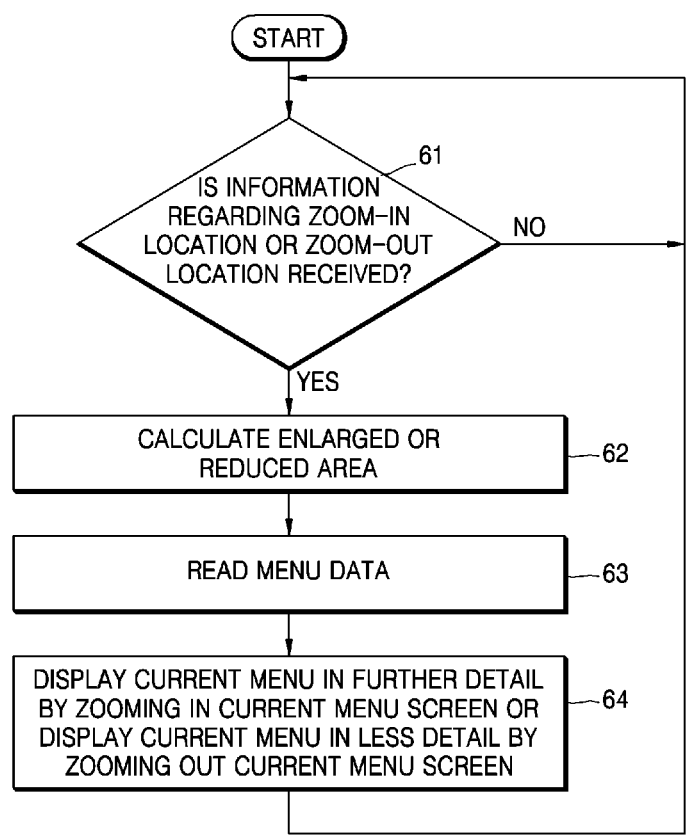
FIG. 6 is a flowchart illustrating a menu display method according to another exemplary embodiment of the present invention.

FIG. 6 is a flowchart illustrating a menu display method according to an exemplary embodiment. The menu display method may be performed in the menu display apparatus of FIG. 3. Therefore, the above description of the menu display apparatus of FIG. 3 may be applicable to the menu display method of FIG. 6. However, the present invention is not limited thereto, and any other apparatus as would be understood by one skilled in the art to implement the exemplary embodiment may be used without departing from the scope of the exemplary embodiment.

In operation 61, the menu display apparatus receives information regarding a zoom-in location or a zoom-out location on a current menu screen from a user. The menu display apparatus may successively receive the information regarding the zoom-in location or the zoom-out location from the user an arbitrary number of times.

In operation 62, the menu display apparatus calculates the area of a portion on the current menu screen corresponding to the zoom-in location or the zoom-out location when zooming in the current menu screen at the zoom-in location or zooming out the current menu screen at the zoom-out location in units of magnitude. If the information regarding the zoom-in location or the zoom-out location is successively input to the menu display apparatus the arbitrary number of times, the menu display apparatus calculates the area of the portion when zooming in the current menu screen at the zoom-in location or zooming out the current menu screen at the zoom-out location in the units magnitude multiplied by the arbitrary number.

In operation 63, the menu display apparatus reads menu data necessary for displaying the calculated area obtained in operation 62 and outputs the read menu data. More specifically, in operation 63, if the current menu screen is determined in operation 61 to be zoomed in to the extent that lower menus below the menus currently displayed on the current menu screen can be displayed, the menu display apparatus reads menu data necessary for switching the current menu screen to a menu screen for displaying the lower menus, i.e., menu data regarding the lower menus.

In operation 63, if the current menu screen is determined in operation 61 to be zoomed out to the extent that upper menus above the current menus can be displayed, the menu display apparatus reads menu data necessary for switching the current menu screen to a menu screen for displaying the upper menus, i.e., menu data regarding the upper menus.

In operation 64, the menu display apparatus zooms in the current menu screen at the zoom-in location so that the current menus is displayed more detail or zooms out the current menu screen at the zoom-out location so that the current menus is displayed in less detail. If the information regarding the zoom-in location or the zoom-out location is successively input to the menu display apparatus an arbitrary number of times in a row in operation 61, the degree to which the current menus become in detail increases or decreases proportionately to the arbitrary number.

In detail, in operation 64, if the current menu screen is determined in operation 61 to be zoomed in to the extent that the lower menus can be displayed, the current menu screen is switched to the menu screen for displaying the lower menus. Alternatively, if the current menu screen is determined in operation 61 to be zoomed out to the extent that the upper menus can be displayed, the current menu screen is switched to the menu screen for displaying the upper menus.

In operation 64, the menu display apparatus may display the current menus, e.g., menus related to the devices 22 through 24 included in the home network environment of FIG. 2 as a map to indicate the locations of the devices 22 through 24 in the corresponding home network environment or the storage capacities of the devices 22 through 24. In addition, in operation 64, the menu display apparatus may display the current menus, e.g., the menus related to the devices 22 through 24 or menus related to a plurality of contents possessed by the devices 22 through 24, in different colors.

The exemplary embodiments can be realized as computer programs that can be written on a computer-readable recording medium and thus can be executed in a computer. Examples of the computer-readable recording medium include a magnetic storage medium (e.g., a ROM, a floppy disc, or a hard disc), an optical storage medium (e.g., a CD-ROM or a DVD), and a carrier wave (e.g., a data transmission through the Internet).

Accordingly, it is possible to minimize content search delay and user inconvenience related to a content search, such as too much screen scrolling, and to help the user to easily and quickly search for content of interest by providing a gradually zoomed-in or zoomed-out view of a plurality of menus currently displayed on a screen using a map search method.

In addition, it is possible for the user to more easily and more quickly search for the content of interest and to easily memorize contents of a plurality of devices included in a home network by providing information regarding the locations of the devices in the home network or the storage capacities of the corresponding devices as a map.

Moreover, it is possible for the user to even more easily and quickly search for the content of interest and to more easily memorize the contents of the devices in the home network by displaying a plurality of menus related to the corresponding devices or a plurality of menus related to the contents of the corresponding devices on the screen in different colors.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A menu display method comprising:

receiving information regarding one of a zoom-in location and a zoom-out location on current menus displayed on a current menu screen by moving one of a zoom-in icon and a zoom-out icon;

determining a plurality of lower menus below the current menus, corresponding to the zoom-in location when the zoom-in icon is placed at the zoom-in location, or a plurality of upper menus above the current menus, corresponding to the zoom-out location when the zoom-out icon is placed at the zoom-out location; and displaying the determined lower menus by zooming in the current menu screen at the zoom-in location or the determined upper menus by zooming out the current menu screen at the zoom-out location, based on the determination result, wherein the zoom-in icon and the zoom-out icon are used for searching for hierarchies of the current menus.

2. The menu display method of claim 1, wherein the zoom-in icon and the zoom-out icon are movable on the current menu screen by a user input, and the zoom-in location and the zoom-out location are locations at which the zoom-in icon and the zoom-out icon are positioned by the user input.

3. The menu display method of claim 1, wherein the current menus comprise a list of network-connectable devices and a list of contents stored in the network-connectable devices.

4. The menu display method of claim 3, wherein the list of the network-connectable devices is displayed on the current menu screen according to locations of the network-connectable devices in a network.

5. The menu display method of claim 1, wherein the current menus are displayed as a map arranged to indicate storage capacities of the network-connectable devices.

6. The menu display method of claim 1, wherein at least one of the current menus, the determined lower menus and the determined upper menus are displayed in different colors.

7. The menu display method of claim 1, further comprising determining whether the current menu screen is zoomed in to a first predetermined extent according to a magnitude at the zoom-in location based on the received information, wherein the determining of the lower menus determines the lower menus, when the current menu screen is determined to be zoomed in to more than the first predetermined extent.

8. The menu display method of claim 7, further comprising displaying the current menu screen enlargedly, when the current menu screen is determined to be zoomed in to less than the first predetermined extent.

9. The menu display method of claim 1, further comprising determining whether the current menu screen is zoomed out to a second predetermined extent according to a magnitude at the zoom-out location based on the received information, wherein the determining of the upper menus determines the upper menus, when the current menu screen is determined to be zoomed out to more than the second predetermined extent.

10. The menu display method of claim 9, further comprising displaying the current menu screen reducedly, when the current menu screen is determined to be zoomed out to less than the first predetermined extent.

11. The menu display method of claim 1, wherein when the receiving of the information is successively received a number of times, the determining of the lower menus or the upper menus determines the lower menus or the upper menus being proportional to the number.

12. The menu display method of claim 1, wherein the displaying the determined lower menus or the determined upper menus are displayed on a display unit of a menu display apparatus connected to network-connectable devices in a network.

13. A menu display apparatus comprising:

an input unit to receive information regarding one of a zoom-in location and a zoom-out location on current menus displayed on a current menu screen by moving one of a zoom-in icon and a zoom-out icon;

a control unit to determines a plurality of lower menus below the current menus, corresponding to the zoom-in location when the zoom-in icon is placed at the zoom-in location, or a plurality of upper menus above the current menus, corresponding to the zoom-out location when the zoom-out icon is placed at the zoom-out location; and a display unit to display the determined lower menus by zooming in the current menu screen at the zoom-in location or the determined upper menus by zooming out the current menu screen at the zoom-out location, based on the determination result, wherein the zoom-in icon and the zoom-out icon are used for searching for hierarchies of the current menus.

14. The menu display apparatus of claim 13, wherein the zoom-in icon and the zoom-out icon are movable on the current menu screen by a user input via the input unit, and the zoom-in location and the zoom-out location are locations at which the zoom-in icon and the zoom-out icon are positioned by the user input.

15. The menu display apparatus of claim 13, wherein the current menus comprise a list of network-connectable devices and a list of contents stored in the network-connectable devices.

16. The menu display apparatus of claim 13, wherein the control unit determines whether the current menu screen is zoomed in to a first predetermined extent according to a magnitude at the zoom-in location based on the received information, and determines the lower menus when the current menu screen is determined to be zoomed in to more than the first predetermined extent.

17. The menu display apparatus of claim 16, the display unit displays the current menu screen enlargedly when the current menu screen is determined to be zoomed in to less than the first predetermined extent by the control unit.

18. The menu display apparatus of claim 13, wherein the control unit determines whether the current menu screen is zoomed out to a second predetermined extent according to a magnitude at the zoom-out location based on the received information, and determines the upper menus when the current menu screen is determined to be zoomed out to more than the second predetermined extent.

19. The menu display apparatus of claim 9, the display unit displays the current menu screen reducedly when the current menu screen is determined to be zoomed out to less than the first predetermined extent by the control unit.

20. The menu display apparatus of claim 13, wherein when the input unit successively received information regarding a number of times, the control unit determines the lower menus or the upper menus being proportional to the number.

* * * * *